(12) United States Patent
Römer (10) Patent No.: US 10,850,640 B2
(45) Date of Patent: Dec. 1, 2020

(54) DEVICE AND METHOD FOR ADJUSTING A SEAT

(71) Applicant: Faurecia Autositze GmbH, Stadthagen (DE)

(72) Inventor: Bernd Römer, Stadthagen (DE)

(73) Assignee: Faurecia Autositze GmbH, Stadthagen (DE)

( * ) Notice: Subject to any disclaimer, the term of this patent is extended or adjusted under 35 U.S.C. 154(b) by 50 days.

(21) Appl. No.: 16/056,092

(22) Filed: Aug. 6, 2018

(65) Prior Publication Data

US 2019/0039482 A1    Feb. 7, 2019

(30) Foreign Application Priority Data

Aug. 7, 2017    (DE) .................. 10 2017 117 847 U (51) Int. Cl.
| | | |
|---|---|---|
| *B60N 2/80* | (2018.01) | |
| *B60N 2/02* | (2006.01) | |
| *B60N 2/821* | (2018.01) | |
| *B60N 2/826* | (2018.01) | |
| *B60N 2/829* | (2018.01) | |
| *B60N 2/809* | (2018.01) | |
| *B60N 2/75* | (2018.01) | |

(52) U.S. Cl.
CPC .............. *B60N 2/0284* (2013.01); *B60N 2/77* (2018.02); *B60N 2/809* (2018.02); *B60N 2/821* (2018.02); *B60N 2/826* (2018.02); *B60N 2/829* (2018.02); *B60N 2002/0212* (2013.01)

(58) Field of Classification Search
CPC ........ B60N 2/809; B60N 2/821; B60N 2/826; B60N 2/829; B60N 2/77; B60N 2/0284
USPC .............. 297/383, 410, 411.36, 284.8, 284.7
See application file for complete search history.

(56) References Cited

U.S. PATENT DOCUMENTS

| | | | | |
|---|---|---|---|---|
| 1,264,265 A * | 4/1918 | Brusius | .................... | A47C 7/46 297/284.7 |
| 4,852,940 A * | 8/1989 | Kanigowski | ............. | A47B 5/00 297/145 |
| 5,393,124 A * | 2/1995 | Neil | ......................... | A47C 1/03 297/116 |
| 5,647,638 A * | 7/1997 | Ritt | ......................... | A47C 1/03 297/411.36 |
| 5,752,739 A * | 5/1998 | Saeki | ..................... | B60N 2/757 297/113 |
| 6,062,649 A * | 5/2000 | Nagel | .................... | A47C 1/023 297/284.7 |
| 6,079,785 A * | 6/2000 | Peterson | ................. | A47C 7/462 297/284.5 |
| 6,126,238 A * | 10/2000 | Klindworth | ............ | B60N 2/809 297/410 |
| 6,203,109 B1 * | 3/2001 | Bergsten | ............ | A47B 21/0371 297/411.35 |

(Continued)

*Primary Examiner* — Syed A Islam
(74) *Attorney, Agent, or Firm* — Henry M. Feiereisen LLC (57) ABSTRACT

An adjustable motor vehicle seat includes a main part, an attachment which is movable relative to the main part, and at least two guide elements. Each guide element has a surface which is spherical in at least one portion, and a receiving portion configured for receiving the main part or the attachment at least in part. The guide elements are mounted in a bearing point of at least one of the main part and the attachment and arranged one behind the other with respect to a direction of translation of the attachment relative to the main part.

13 Claims, 8 Drawing Sheets

(56) References Cited

U.S. PATENT DOCUMENTS

| | | | | |
|---|---|---|---|---|
| 6,224,158 B1* | 5/2001 | Hann | ............... | B60N 2/809 |
| | | | | 297/391 |
| 6,354,662 B1* | 3/2002 | Su | ............... | A47C 7/46 |
| | | | | 297/284.4 |
| 6,575,530 B1* | 6/2003 | Fischer | ............... | A47C 7/282 |
| | | | | 297/284.1 |
| 6,976,739 B2* | 12/2005 | Wang | ............... | A47C 1/03 |
| | | | | 297/411.2 |
| 7,097,247 B2* | 8/2006 | Battey | ............... | A47C 1/03255 |
| | | | | 297/284.4 |
| 7,303,232 B1* | 12/2007 | Chen | ............... | A47C 7/38 |
| | | | | 297/284.7 |
| 7,344,194 B2* | 3/2008 | Maier | ............... | A47C 7/46 |
| | | | | 297/284.4 |
| 8,562,072 B2* | 10/2013 | Ishimoto | ............... | B60N 2/4228 |
| | | | | 297/216.12 |
| 8,814,271 B2* | 8/2014 | Ishimoto | ............... | B60N 2/838 |
| | | | | 297/408 |
| 8,876,211 B2* | 11/2014 | Tscherbner | ............... | A47C 7/38 |
| | | | | 297/410 |
| 8,926,020 B2* | 1/2015 | Jeong | ............... | B60N 2/888 |
| | | | | 297/408 |
| 9,572,741 B2* | 2/2017 | Weaver | ............... | A61F 5/3723 |
| 2002/0093231 A1* | 7/2002 | Estrada | ............... | B60N 2/829 |
| | | | | 297/216.12 |
| 2007/0228797 A1* | 10/2007 | Wang | ............... | A47C 1/03 |
| | | | | 297/410 |
| 2014/0312668 A1* | 10/2014 | Hurford | ............... | A47C 1/03261 |
| | | | | 297/284.7 |
| 2015/0015049 A1* | 1/2015 | Mueller | ............... | B60N 2/829 |
| | | | | 297/410 |

* cited by examiner

DEVICE AND METHOD FOR ADJUSTING A SEAT

CROSS-REFERENCES TO RELATED APPLICATIONS

This application claims the priority of German Patent Application, Serial No. 10 2017 117 847.3, filed Aug. 7, 2017, pursuant to 35 U.S.C. 119(a)-(d), the disclosure of which is incorporated herein by reference in its entirety as if fully set forth herein.

BACKGROUND OF THE INVENTION

The present invention relates to an adjustable motor vehicle seat.

The following discussion of related art is provided to assist the reader in understanding the advantages of the invention, and is not to be construed as an admission that this related art is prior art to this invention.

Many modern motor vehicle seats for motor vehicles are provided with components by means of which at least one part of the seat can be adjusted individually for the person sitting therein. Examples of adjustable parts of this kind are adjustable lumbar supports, adjustable side and back supports, or massage functions. Seats that provide a user with the possibility of adjusting at least one part of the seat are used in modern motor vehicles in order to offer the user improved comfort. This may be particularly important when the user is in the seat for a long period of time. An example is a seat for passenger transport, for example a car, bus or aircraft seat. In order to accommodate different sizes of passengers, it is expedient to use a seat, in the vehicles mentioned, that makes it possible to adjust the size of the seat cushion. This can be achieved by raising the seat surface and/or reducing the length (depth) of a seat cushion. In this case, it is possible to adjust the depth of the seat cushion on which the users' upper legs rest.

The adjustment may be manually operated or motor-driven. Motor-driven adjustments increase user-friendliness. The user can easily actuate the motor-driven adjustment by means of a controller. The seat can also automatically assume a pre-set position.

In general, a seat-depth adjustment includes a carriage on which the seat surface is mounted, and the seat frame, which establishes the connection to the remainder of the seat. The carriage and seat frame have common guides, by means of which the carriage and seat frame are displaced against one another. Owing to manufacturing tolerances, the fundamental difficulty associated with parts that are movable towards one another, and due to deformations triggered by external forces (e.g. weight and movement of the user), degrees of freedom (play) result about the vertical axis (yawing), the longitudinal axis (rolling) and the transverse axis (pitching). One approach to address the adverse affect of these degrees of freedom involves the use of a guide that includes resilient bends. These bends generate however high friction forces between carriage and guide.

An adjustable motor vehicle seat according to the invention is designed such that play is prevented about the three movement axes of the attachment by means of a corresponding arrangement and geometrical design of the guide elements. Moreover, the friction forces are so greatly reduced that a significantly smaller application of force is required for adjustment.

It would therefore be desirable and advantageous to provide an improved adjustable motor vehicle seat which obviates prior art shortcomings and minimizes play between attachment and main part, and which can be manufactured in a simple and cost-effective manner, while reducing a drive force of the adjustment.

SUMMARY OF THE INVENTION

A motor vehicle seat according to the invention includes a main part and an attachment. The attachment is used to uncouple a part of the seat from the remaining part of the seat and move it relative to the main part. The part that can be displaced by the user, for example in order to achieve a more comfortable seat position, is mounted on the attachment. The main part is rigidly connected to the remainder of the motor vehicle seat. The attachment can be displaced relative to the main part by means of at least two guide elements. In this case, the two guide elements are arranged one behind the other with respect to the direction of translation of the attachment relative to the main part. The advantage of this is that rotational movements of the attachment relative to the main part are prevented.

Adjustments of this type are conceivable for a very wide range of applications and can be used, for example, for the following adjustment:
- guide for a height-adjustable headrest (attachment) relative to the backrest (main part)
- the front part (attachment) of a length-adjustable headrest (main part) side parts (attachment; for sleeping) that can be extended from the headrest (main part)
- guide for an armrest (attachment) relative to a motor vehicle seat (main part)
- a part (attachment, e.g. the padded part) of an armrest (main part) for releasing a stowage space
- a guide for extending an actuation means (attachment; e.g. touchscreen) or a cup holder (attachment) from the armrest (main part)
- guide for a multimedia device (attachment; e.g. out of the backrest (main part)
- a monitor (attachment) that can be extended out of the headrest (main part)
- guide for a retractable footrest (attachment) from a motor vehicle seat (main part).

According to one aspect of the present invention, an adjustable motor vehicle seat includes two guide elements that prohibit the degree of freedom in the lateral direction such that a movement of the attachment about the vertical axis (yawing) is prevented. Yawing movements occur for example when the user moves back and forth in the motor vehicle seat. Prevention of these movements results in greater comfort for the user.

In order to prevent the yawing movements, in a particular embodiment of the invention the two guide elements are arranged so as to be diagonally opposed. This arrangement effectively prohibits yawing of the attachment. The user sits comfortably for example.

According to another advantageous feature of the present invention, the two guide elements can be arranged so as to have a small lateral mutual spacing. The yawing movements of the attachment are prevented more effectively the smaller the mutual lateral spacing.

According to another advantageous feature of the present invention, the spacing between the two guide elements for preventing the yawing movements can be less than 80%, preferably less than 60%, and particularly preferably less than 40% of the width of the attachment. The yawing movements of the attachment are smaller the smaller the lateral spacing between the guide elements.

According to another advantageous feature of the present invention, the adjustable motor vehicle seat can include two further guide elements that prevent the movement of the attachment about the longitudinal axis (rolling) and the transverse axis (pitching). These movements may arise for example due to movements of the user and the resulting shifting of weight.

According to another advantageous feature of the present invention, the two further guide elements for preventing the rolling and pitching movement of the attachment can be arranged on the sides of the attachment. This arrangement effectively prohibits the rolling and pitching movement of the attachment.

According to another advantageous feature of the present invention, the two further guide elements for preventing the rolling and pitching movement of the attachment can be arranged so as to have a large mutual spacing. This arrangement prevents the rolling and pitching movements of the attachment.

According to another advantageous feature of the present invention, a spacing between the two further guide elements for preventing the rolling and pitching movement of the attachment can be more than 20%, preferably more than 30%, and particularly preferably more than 40% of the length of the attachment. Rolling and pitching movements of the attachment are smaller the larger the spacing between the guide elements.

According to another advantageous feature of the present invention, the two further guide elements for preventing the rolling and pitching movement of the attachment can be arranged so as to have a small lateral spacing from the lateral edge of the attachment. A small spacing from the sides of the attachment is necessary for preventing the rolling and pitching movement of the attachment.

According to another advantageous feature of the present invention, the lateral spacing between the two further guide elements for preventing the rolling and pitching movement of the attachment and the lateral edge of the attachment can be less than 20%, preferably less than 10%, and particularly preferably less than 5% of the width of the attachment. This arrangement on the edge of the attachment effectively prohibits the rolling and pitching movements of the attachment.

According to another advantageous feature of the present invention, four guide elements for preventing the rolling and pitching movement of the attachment can be arranged on the sides of the attachment. Two guide elements for preventing the rolling and pitching movement of the attachment are in each case positioned on opposing sides of the attachment in each case, and thus form the corners of a rectangle. This arrangement of the four guide elements for preventing the rolling and pitching movement of the attachment effectively prohibits the rolling and pitching movement of the attachment.

The cross section of the guide element according to the invention for use in a motor vehicle can be circular at least in portions. In this case, the cross section is perpendicular to the movement direction of the attachment. Such a shape of the guide element reduces the friction forces between the guide element and the bearing point, and the motor vehicle seat according to the invention comprising an adjustment means requires a smaller application of force. This arrangement allows a relative movement between the attachment and the main part. In this case it is irrelevant for this relative movement whether the guide element receives the attachment or the main part in the receiving portion.

According to another advantageous feature of the present invention, the receiving portion of the guide element for use in a motor vehicle seat can be designed such that the receiving portion comprises a groove. The attachment and/or the main part can be pushed into said groove with little effort. The weight of the attachment and/or of the main part ensures a lasting connection between the guide element and the attachment and/or the main part, and can be implemented simply and cost-effectively in pre-existing adjustments.

According to another advantageous feature of the present invention, the guide element for use in a motor vehicle seat can be designed such that the depth of the groove is more than 50%, preferably more than 60%, and particularly preferably more than 75% of the width of the groove.

According to another aspect of the present invention, a method for adjusting a motor vehicle seat is designed such that a relative movement of the attachment of the motor vehicle seat with respect to the main part is possible. The relative movement is made possible by guide elements that are mounted in guides. In this case, the guide elements are designed so as to be movable about an axis in parallel with the movement direction of the relative movement during the relative movement. The guide elements absorb forces resulting from shifting of weight, e.g. resulting from movement of the user, and said forces are compensated for by means of this arrangement.

The guide element comprises a receiving portion that is designed so as to be able to receive the main part and/or the attachment. The guide element is mounted in a bearing point of the main part and/or of the attachment and thus allows a relative movement between the attachment and the main part. It is irrelevant for this relative movement whether the guide element receives the attachment or the main part in the receiving portion. The guide element and the bearing point of the attachment or main part have a cross section that is circular at least in part. A substantially globular or spherical guide element significantly reduces the friction forces between the guide element and the bearing point compared with solutions known hitherto, and the motor vehicle seat according to the invention comprising an adjustment means requires a smaller application of force.

According to another advantageous feature of the present invention, the adjustable motor vehicle seat can include a motor-driven adjustment mechanism to implement the relative movement between the attachment and the main part. Motor-driven adjustment mechanisms are advantageous over manual adjustment. The comfort for the user is increased. Moreover, the user can automatically move the motor vehicle seat into the position most comfortable for him by means of an interface. Depending on the embodiment, further parts of the motor vehicle seat can additionally be adjusted using the motor-driven adjustment means.

According to another advantageous feature of the present invention, the motor-driven adjustment mechanism can include a spindle drive. The spindle can be flexible and is also not susceptible to forces transverse to the spindle. A spindle drive thus operates reliably even under aggravated conditions.

According to another advantageous feature of the present invention, the guide element can be rotatably mounted in the main part and/or the attachment. Rotatable mounting reduces the play between the guide element and the bearing thereof, with respect to forces both in the longitudinal direction and in the transverse direction.

According to another advantageous feature of the present invention, the curvature of the cross section of the guide element can be the same as the curvature of the cross section of the bearing point, at least in portions. This geometry ensures that the play between the guide element and the bearing point is minimized and that transverse forces are compensated for at the same time.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Figure 1:
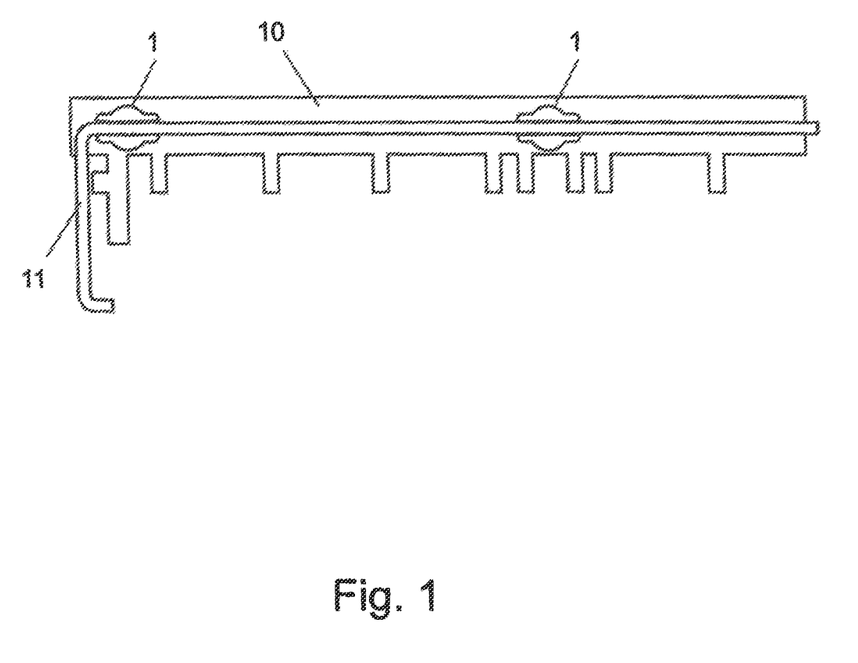
FIG. 1 shows a schematic illustration of an arrangement of two guide elements positioned one behind the other.

FIG. 1 shows an arrangement in which, during the translational movement, the attachment 11 is guided, on one side of the attachment 11, by means of two guide elements 1 during the adjustment. The guide elements 1 are arranged one behind the other. The attachment 11 is pushed into the guide elements 1. This allows for a horizontal relative movement between the attachment 11 and the main part 10. This arrangement significantly minimizes the play between the attachment 11 and the main part 10. The ease of movement is maintained as a result of the possible rotational movement of the guide elements 1 about axes in parallel with and perpendicular to the movement direction, while the play, and therefore the quality perceived by the user, is still ensured.

Figure 2:
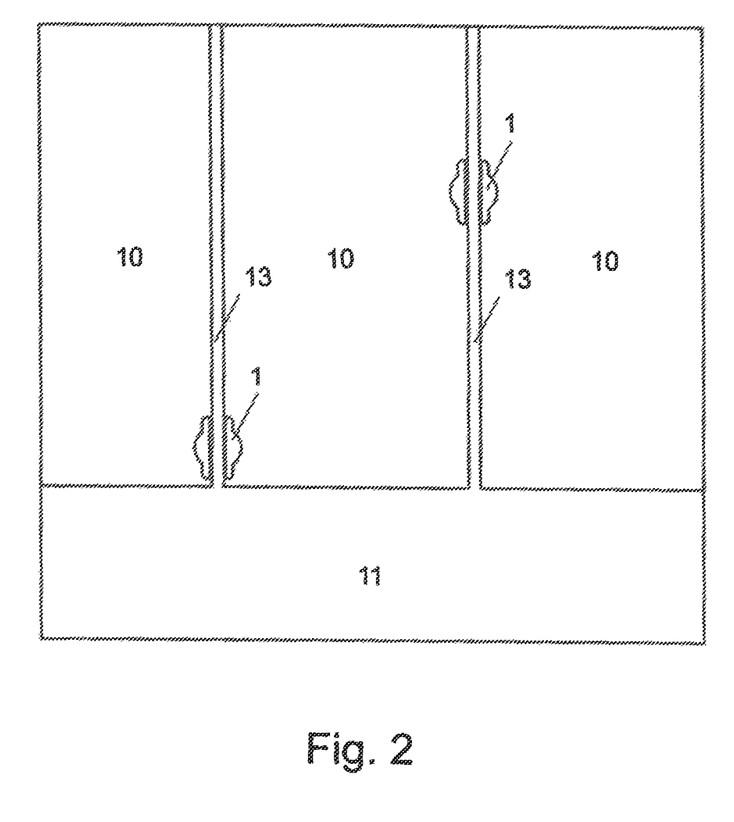
FIG. 2 shows a schematic illustration an arrangement of two guide elements positioned side-by-side.

In order to prevent the yawing movements (rotation of the attachment 11 about the vertical axis) two guide elements 1 are arranged so as to be substantially diagonal (FIG. 2). Yawing movements occur when the user moves back and forth in the motor vehicle seat for example. The user sits more comfortably when said yawing movements are minimized. The attachment 11 is connected to the guide elements 1 by means of two guide rails 13 and can carry out a movement relative to the main part 13 and for example thus change the length of the seat surface. The lateral spacing of the guide elements 1 is selected so as to be as small as possible, particularly preferably less than 40% of the width of the attachment 11. The yawing movements of the attachment are smaller the smaller the lateral spacing between the guide elements.

Figure 3:
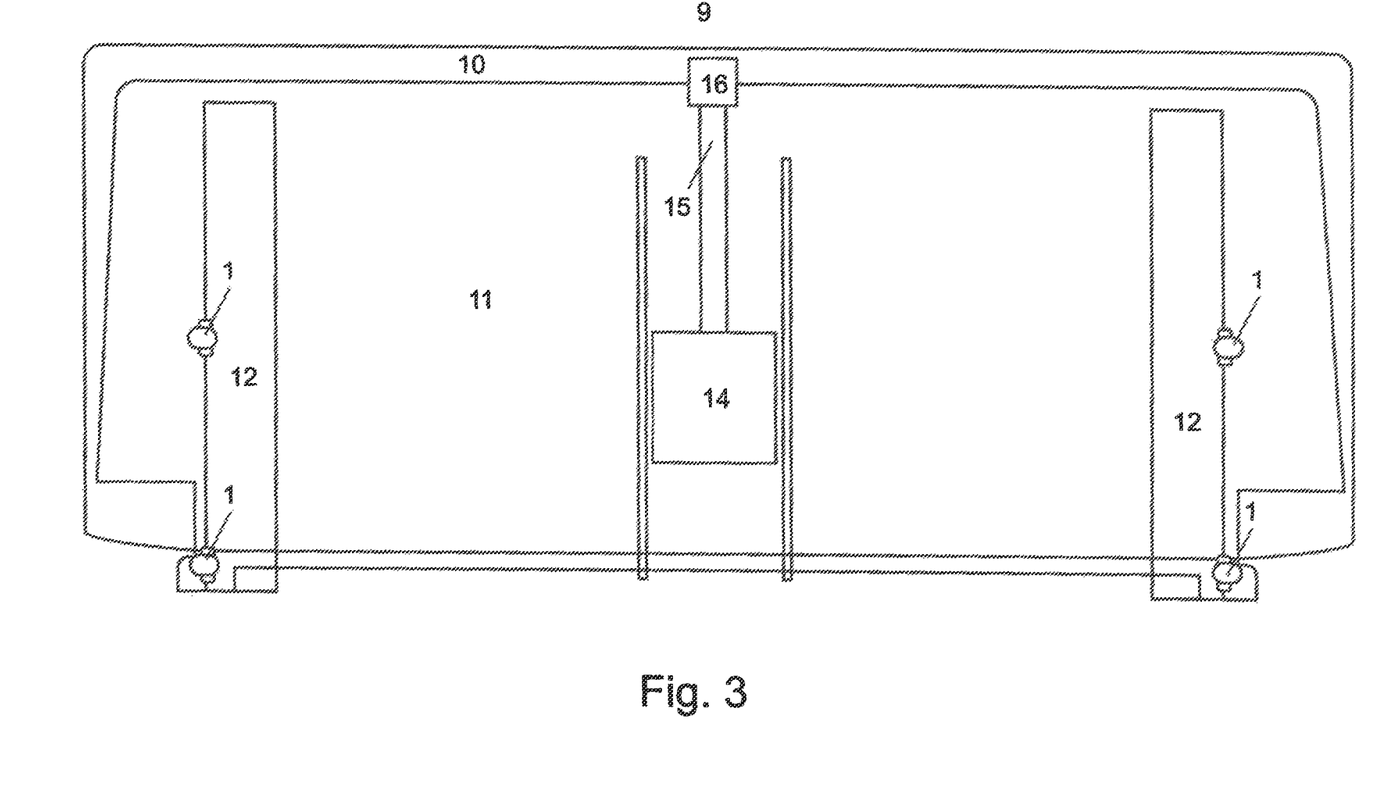
FIG. 3 is a view from above of an arrangement of the guide elements for preventing the rolling and pitching movement.

The seat-depth adjustment means 9 can be operated using a motorized adjustment means (FIG. 3). Motor-driven adjustment means are advantageous over manual adjustment means. The comfort for the user is increased. The user can automatically move the motor vehicle seat, for example into the position most comfortable for him, by means of an interface. Moreover, further parts of the motor vehicle seat, e.g. the backrest, can be moved by means of the motor. The motor 14 drives the seat frame 10 via a spindle 15 and a connecting element 16 and moves said frame relative to the carriage 11. The spindle 15 can be flexible and operates reliably even in the event of forces transverse to the spindle. In this embodiment, in order to prevent the rolling and pitching movements, four guide elements 1 are arranged so as to substantially form the corners of a rectangle. These rolling and pitching movements may arise for example due to movements of the user and the resulting shifting of weight. The seat frame is connected to the guide elements 1 by means of two guide rails on the seat frame 12. The guide elements 1 are arranged so as to have a mutual spacing that is as large as possible, particularly preferably more than 40% of the length of the carriage 11. Moreover, the guide elements 1 are located close to the edge of the carriage 11. The rolling and pitching movements of the carriage 11 are smaller the greater the mutual spacing of said guide elements and the closer to the edge of the carriage 11 said elements are attached.

Figure 4:
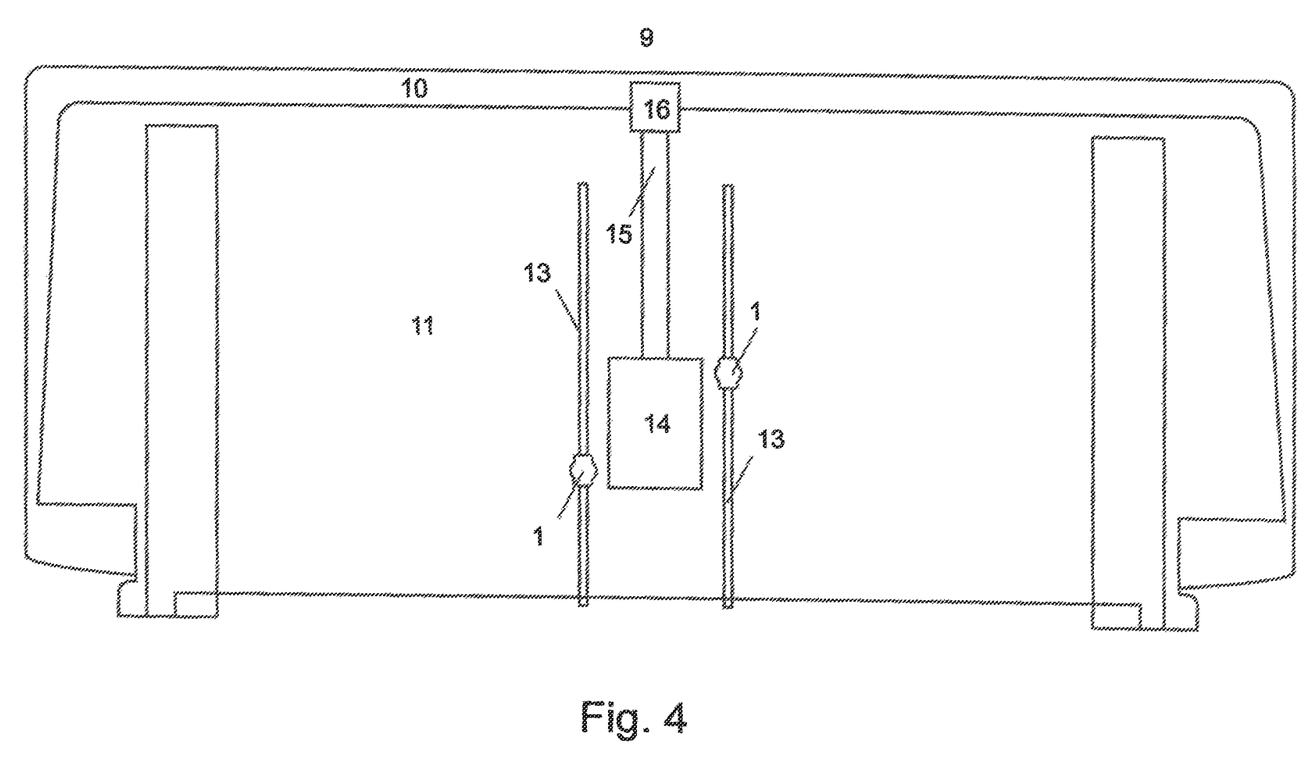
FIG. 4 is a view from above of an arrangement of the guide elements for preventing the yawing movement.

FIG. 4 shows the arrangement of the guide element 1 for preventing the yawing movements of the seat-depth adjustment means 9. In this embodiment, the motor 14 drives the carriage 11 via a spindle 15 and the connecting element 16 and moves said carriage relative to the seat frame 10. The carriage 11 is connected to the two guide elements 1 by means of two guide rails 13. The guide elements 1 are arranged so as to have a diagonal mutual spacing that is as large as possible, but at the same time a small lateral spacing. This arrangement minimizes the yawing movements.

Figure 5A:
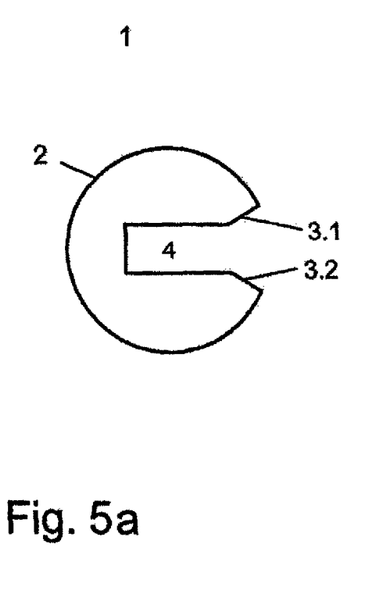
FIGS. 5a and b show front and side views of a guide element having a spherical surface.
Figure 5B:
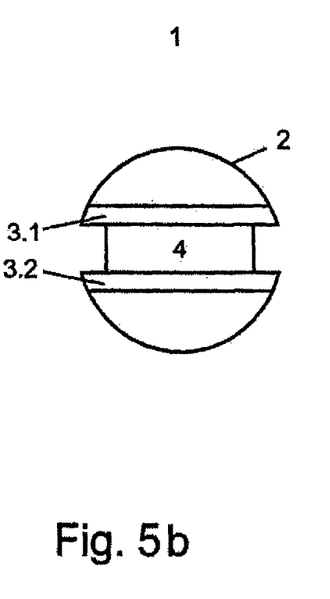

According to the present invention (FIG. 5 a, b) the guide element 1 has a curved surface 2 and, in this embodiment, is substantially spherical. This shape ensures that the guide element 1 can be mounted so as to be rotatable in all directions and minimizes the friction forces between the guide element 1 and the bearing point 7 of the guide element 1. The guide element 1 comprises a receiving portion 4. The receiving portion 4 is in the shape of a groove and comprises two angled surfaces 3.1, 3.2 that transition into the main body of the guide element 1. Elements or components of the seat frame 10 or of the carriage 11 can be inserted into the groove-like receiving portion 4.

Figures 6A, 6B:
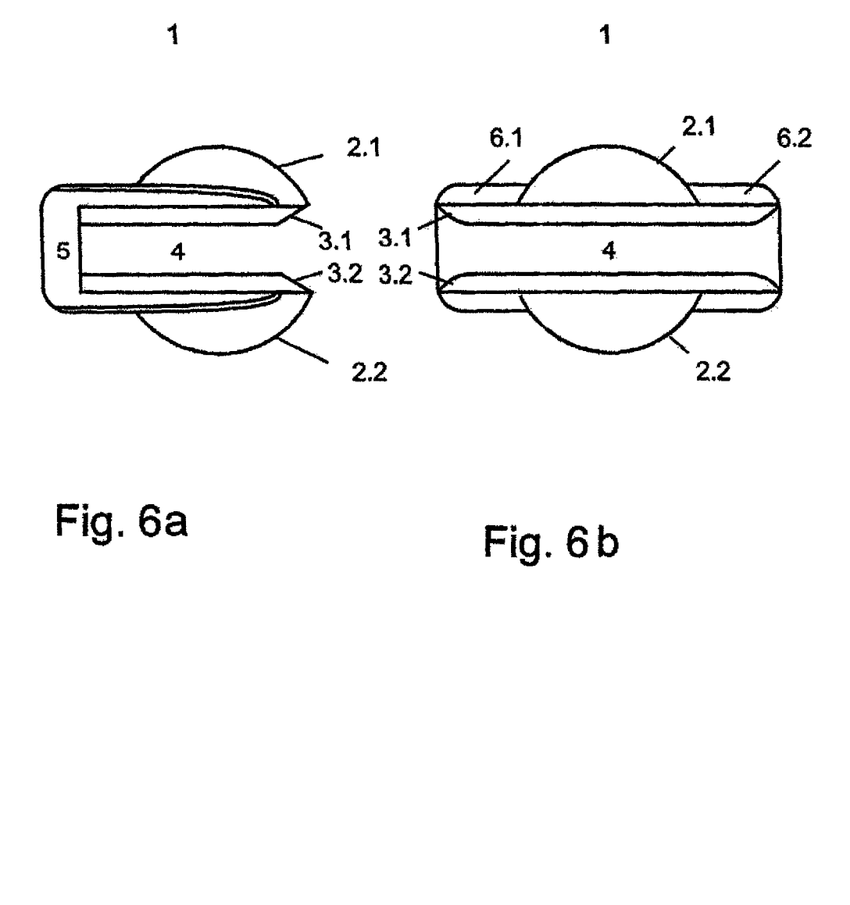
FIG. 6a to c show front, side and plan views of a guide element having a spherical surface, side limbs and a pocket.
Figure 6C:
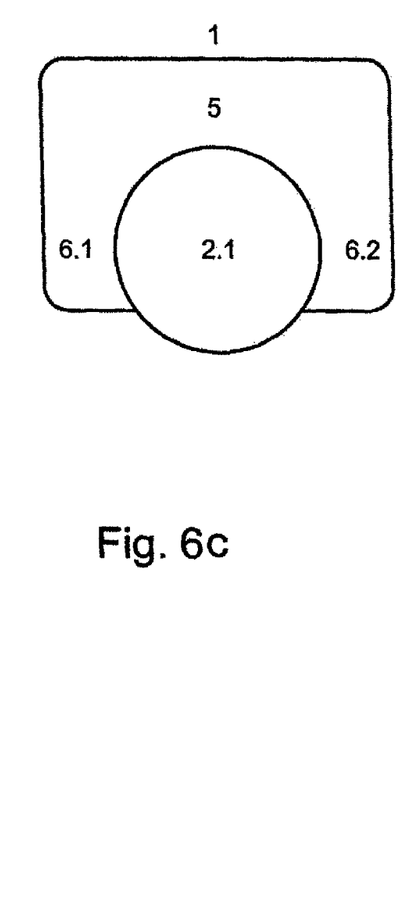

FIG. 6 shows a further embodiment of the guide element 1. In comparison with the previous embodiment, the guide element 1 comprises side limbs 6.1, 6.2 that extend the length of the guide element 1 and thus provide the component with better adhesion in the groove-like receiving portion 4. Furthermore, the lengthened receiving portion reduces the play. Moreover, the pocket 5 increases the depth of the groove-like receiving portion 4. In the drawings, FIG. 6 a) shows the front view, FIG. 6 b) shows the side view and FIG. 6 c) shows the plan view.

Figure 7:
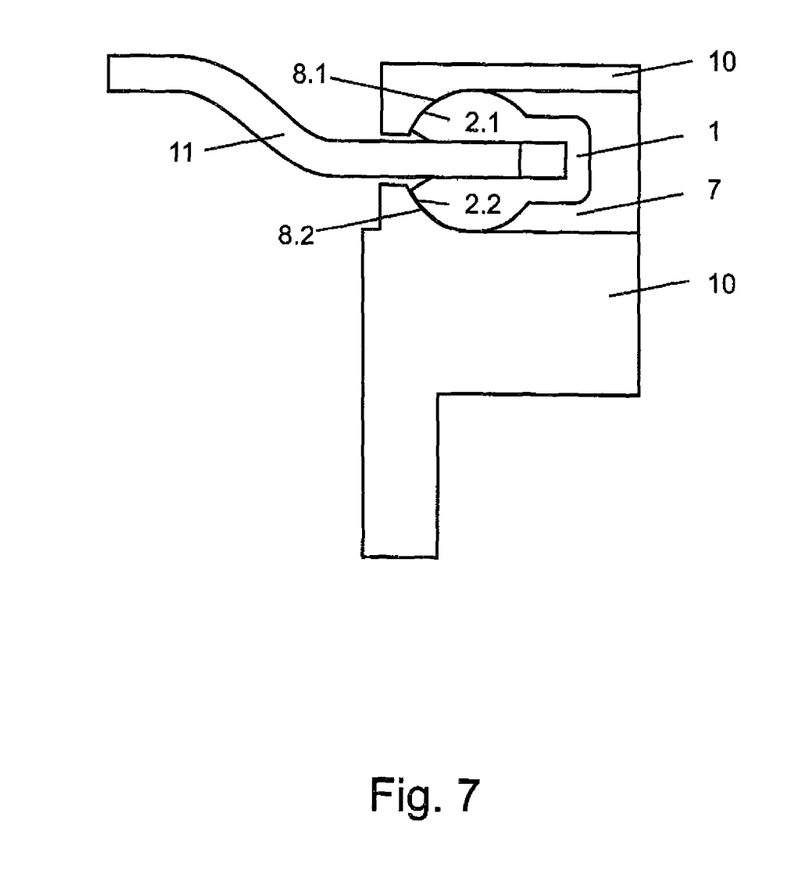
FIG. 7 shows a schematic illustration of a guide element mounted in the bearing point of the seat frame, having a component of the carriage in the receiving portion of the guide element.

FIG. 7 shows the guide element 1 mounted in a bearing point 7 in the main part 10 such that the guide element 1 is rotatable about the transverse axis thereof (in the direction of translation of the attachment). In this case, the bearing point 7 is designed such that the radius of the concavely curved surface 8.1, 8.2 thereof approximately matches the radius of the curved surface 2.1, 2.2 of the guide element, such that the guide element 1 has only a small amount of play. The guide element 1 receives the attachment 11 by means of the groove-like receiving portion 4 and thus allows a relative movement between the attachment 11 and the main part 10. The depth of the receiving portion 4 is greater than the depth to which the attachment 11 penetrates by default (i.e. according to the design plan). This means that it is also possible to compensate for manufacturing tolerances or deformations in this direction without the mobility of the attachment 11 relative to the main part 10 being impaired and the attachment 11 and the main part 10 becoming wedged together. The movement direction of the relative movement between the main part 10 and the attachment 11 is perpendicular to the cross section of the guide element 1. It is also possible to mount the guide element 1 in the attachment 11. In this case, the groove 4 of the guide element 1 receives the main part 10.

Figure 8:
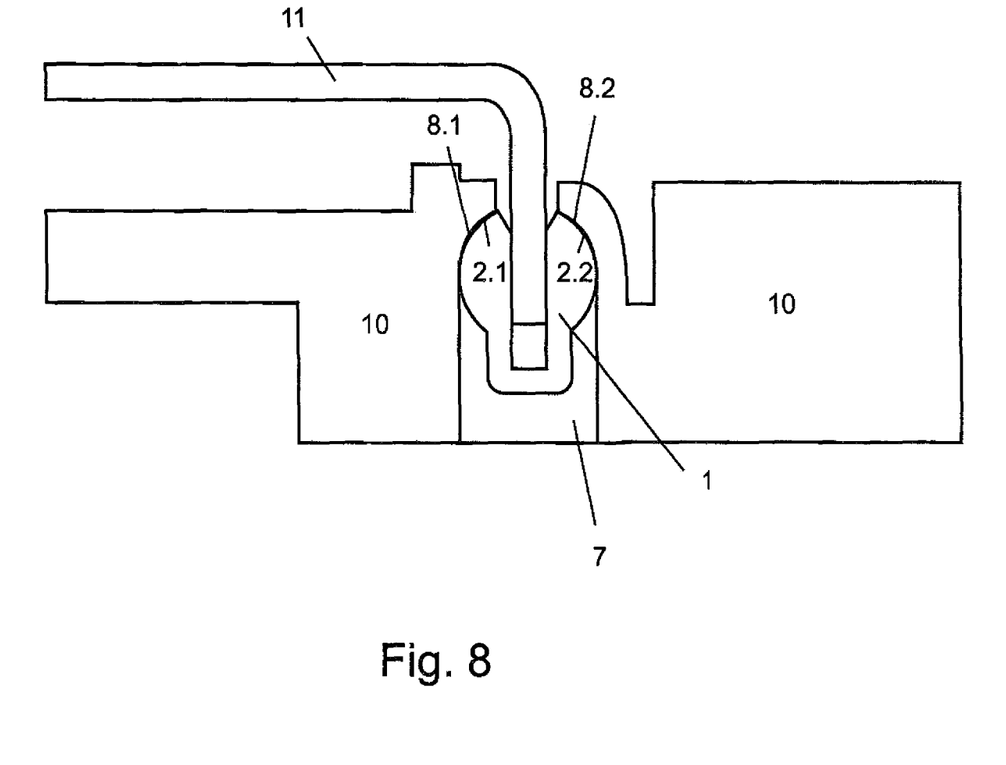
FIG. 8 shows a schematic illustration of a guide element mounted in the bearing point of the carriage, having a component of the seat frame in the receiving portion of the guide element.

FIG. 8 shows another arrangement of the guide element 1. In this case, the guide element 1 is installed such that the opening of the receiving portion 4 is oriented upwards. Said guide element is mounted in a bearing point 7 of the main part 10. The bearing point comprises concavely curved spherical surfaces 8.1, 8.2 that act as a sliding surface for the guide element 1. The guide element 1 comprises convexly curved spherical surfaces 2.1, 2.2 that correspond to the curved surfaces 8.1, 8.2 of the bearing point 7. The attachment 11 is designed so as to curve downwardly, substantially at a right-angle, at the end that is guided in the receiving portion 4 of the guide element 1. The receiving portion 4 of the guide element 1 is designed having an additional pocket 5 that lengthens the receiving portion 4 over the sphere cross section. In this case, the length of the groove-like receiving portion 4 is selected such that the attachment 11 does not rest on the end of the receiving portion 4 or pocket 5, but instead a small gap remains between the attachment 11 and the pocket 5. When the length of the attachment 11 changes due to stress, e.g. due to the weight of the user, this is compensated for in this way. Furthermore, the receiving portion 4 comprises angled surfaces 3.1, 3.2 on the upper edge thereof, which surfaces facilitate the insertion of the attachment 11 into the groove-like receiving portion 4. This arrangement can compensate for manufacturing tolerances and deformations owing to use and/or stress in the direction of the opening of the receiving portion 4, and due to rotation about an axis that is in parallel with the movement direction of the attachment 11, as well as perpendicular thereto.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An adjustable motor vehicle seat, comprising:
a main part;
an attachment movable relative to the main part; and
at least two guide elements, each said guide element having a surface which is spherical in at least one portion, and a receiving portion configured for receiving the main part or the attachment at least in part, said guide elements being mounted in a bearing point of at least one of the main part and the attachment and being arranged one behind the other with respect to a direction of translation of the attachment relative to the main part.

2. The motor vehicle seat of claim 1, wherein the two guide elements are arranged so as to have a small lateral mutual spacing.

3. The motor vehicle seat of claim 2, wherein the spacing between the guide elements is less than 80%, preferably less than 60%, particularly preferably less than 40% of the width of the attachment.

4. The motor vehicle seat of claim 2, wherein a ratio of the lateral spacing between the guide elements to a spacing in the direction of translation between the guide elements is less than or equal to 1.5, preferably less than or equal to 1, and particularly preferably less than or equal to 0.5.

5. The motor vehicle seat of claim 1, further comprising two further guide elements for preventing a pitching and/or rolling movement of the attachment relative to the main part.

6. The motor vehicle seat of claim 5, wherein the two further guide elements are arranged on a side of the attachment.

7. The motor vehicle seat of claim 5, wherein the two further guide elements are arranged so as to have a large mutual spacing with respect to the direction of translation.

8. The motor vehicle seat of claim 7, wherein the spacing between the guide elements is more than 20%, preferably more than 30%, particularly preferably more than 40% of a length of the attachment.

9. The motor vehicle seat of claim 5, wherein the two further guide elements are arranged so as to have a small lateral spacing from a lateral edge of the attachment.

10. The motor vehicle seat of claim 9, wherein the spacing between the guide elements and the lateral edge of the carriage is less than 20%, preferably less than 10%, particularly preferably less than 5% of the width of the attachment.

11. The motor vehicle seat of claim 5, wherein four further said guide elements are arranged on sides of the attachment, two of said four guide elements being arranged on one side of the attachment and two of said four guide elements being arranged on another side of the attachment.

12. The motor vehicle seat of claim 1, further comprising a motorized adjustment mechanism to implement a relative movement between the attachment and the main part.

13. The motor vehicle seat of claim 12, wherein the motorized adjustment mechanism comprises a spindle drive.

* * * * *